United States Patent  [11] 3,603,464

[72] Inventor Gheorghe Marcel Teodorescu
 Stirbei Voda, Romania
[21] Appl. No. 870,508
[22] Filed Oct. 1, 1969
[45] Patented Sept. 7, 1971
[73] Assignee Interprinderea Montaje Conducte
 Magistrale
 Brasov, Romania
[32] Priority Dec. 2, 1968
[33] Romania
[31] 58361

[54] UNDERCARRIAGE TRAILER FOR HANDLING
 AND TRANSPORTING ELONGATED BODIES
 2 Claims, 4 Drawing Figs.
[52] U.S. Cl. .................................................. 214/77,
 212/8, 212/145
[51] Int. Cl. .................................................. B60p 1/48
[50] Field of Search .......................................... 212/8, 145,
 8 A, 8 B; 214/77, 147 G, 78, 80

[56] References Cited
 UNITED STATES PATENTS
3,421,791 1/1969 Lindqvist ...................... 214/77 UX
3,445,014 5/1969 Kullerback .................... 214/77
3,452,887 7/1969 Larson et al. .................. 214/80
3,487,964 1/1970 Riley ............................ 214/77
 FOREIGN PATENTS
 899,484 6/1962 Great Britain ................. 214/77
Primary Examiner—Gerald M. Forlenza
Assistant Examiner—Robert J. Spar
Attorney—Karl F. Ross ABSTRACT: A trailer has an underslung carriage provided with a lifting installation for depositing elongated bodies upon the trailer and transferring them to and from the trailer. The installation comprises a pair of crescent-shaped articulated arms mounted upon a pivotal support and adapted to lift the elongated bodies for transfer purposes and to surround the bodies to retain them during transport.

GHEORGHE MARCEL TEODORESCU
INVENTOR

BY Karl F. Ross
ATTORNEY

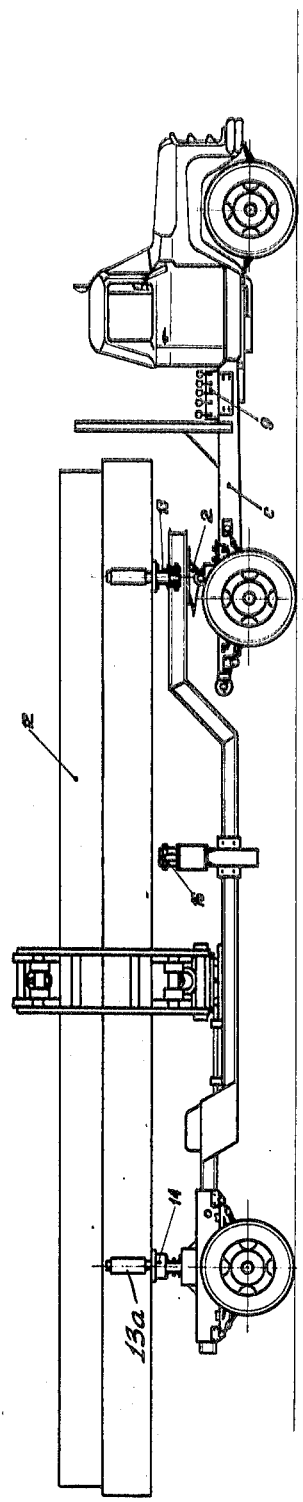

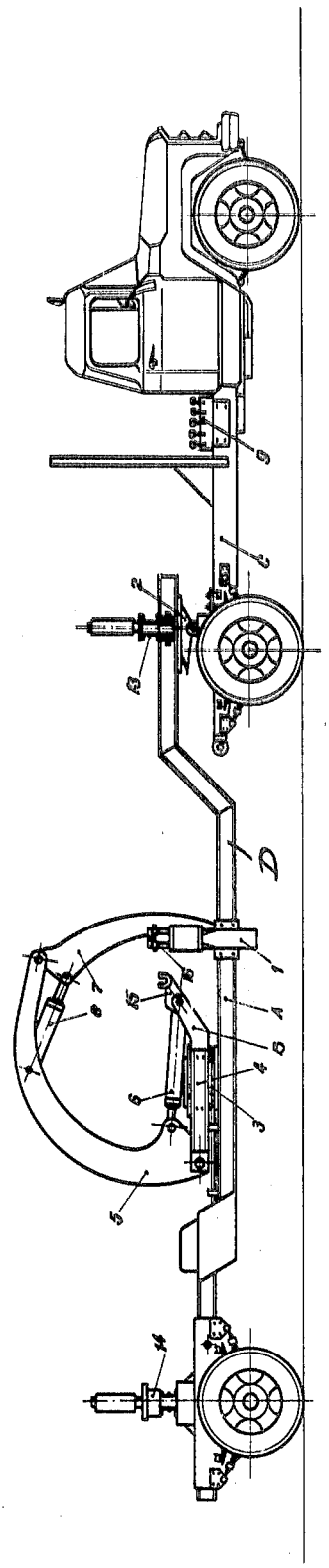

UNDERCARRIAGE TRAILER FOR HANDLING AND TRANSPORTING ELONGATED BODIES

FIELD OF THE INVENTION

This invention relates to an undercarriage trailer provided with a hydraulic installation for loading and unloading or transferring materials; the arms of hydraulic installation immobilize the load during transport.

BACKGROUND OF THE INVENTION

Trailers are known for handling and transport of long (elongated) bodies provided with mechanically or hydraulically operated arms which lift and place on the trailer the elongated bodies. The drawbacks of these installations consist in the fact that they can act only in a single vertical plane and that the load must be fixed by other means to the trailer for transport.

OBJECT OF THE INVENTION

It is the object of the invention to provide an improved trailer obviating the aforementioned disadvantages.

SUMMARY OF THE INVENTION

The undercarriage trailer, according to the invention, does away with the above-mentioned drawbacks by providing pressing-on or pressure shoes, and an installation for loading and unloading the objects; the installation consists of pin support or pivot, on which a pivoting frame can rotate. The frame forms a carrier which a curved arm is articulated; the crescent-shaped or C-shaped arm is operated by a hydraulic cylinder.

Another curved (C-shaped or crescent-shaped) closing arm is articulated to the first arm and is operated by another hydraulic cylinder. Both hydraulic cylinders are driven by a volumetric pump coupled to the gearbox of the tractor by means of a control distributor, all handling operations being performed with the aid of a hook fixed at the end of the second curved arm.

After being loaded, the objects placed upon supporting beams are fastened by the curved arms, which build a safety belt during transport. When the undercarriage trailer is running without load, the curved arms are disposed longitudinally as the chassis, and the second curved arm rests on a support which ties together the ends of the pressure shoes.

DESCRIPTION OF THE DRAWINGS

The above and other objects, features and advantages of the present invention will become more readily apparent from the following description reference being made to the accompanying drawing in which:

FIG. 3 is a side elevational view of the loaded trailer and

FIG. 4 is a side elevational view of the trailer without a load.

SPECIFIC DESCRIPTION

Figure 1:
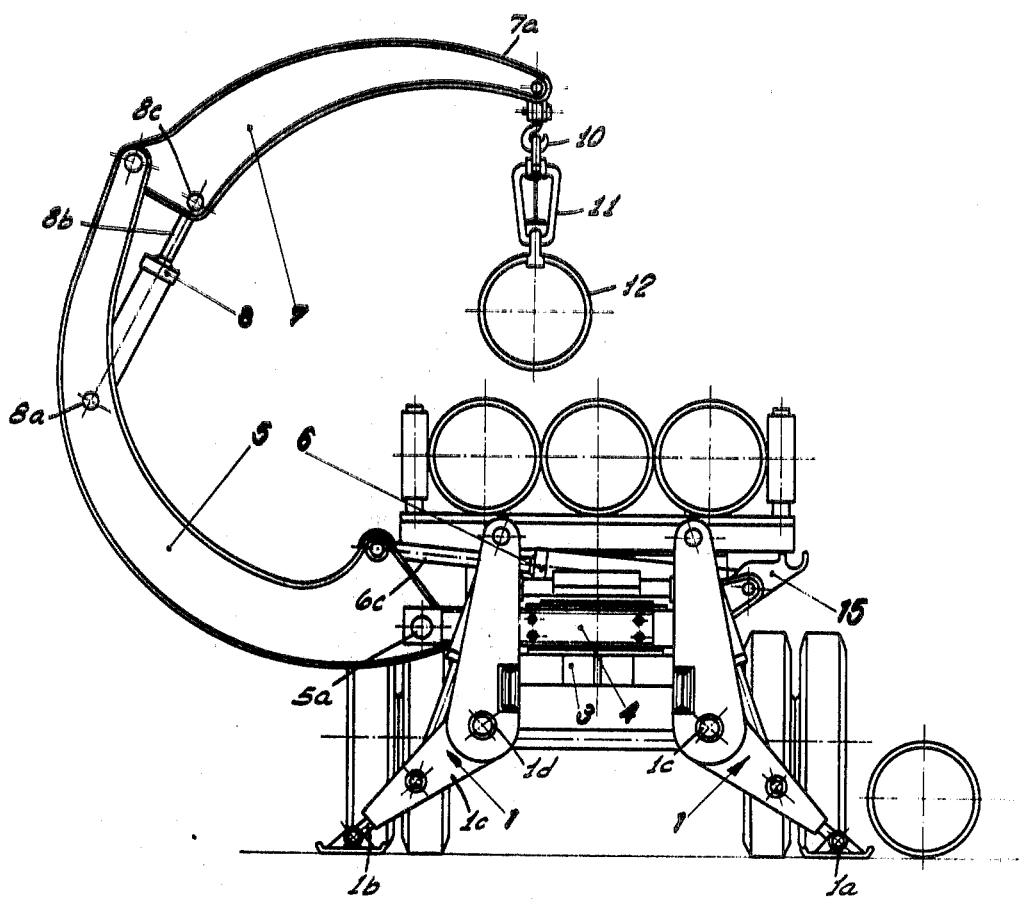
FIG. 1 is a vertical cross-sectional view transverse to the undercarriage of a trailer embodying the present invention.
Figure 2:
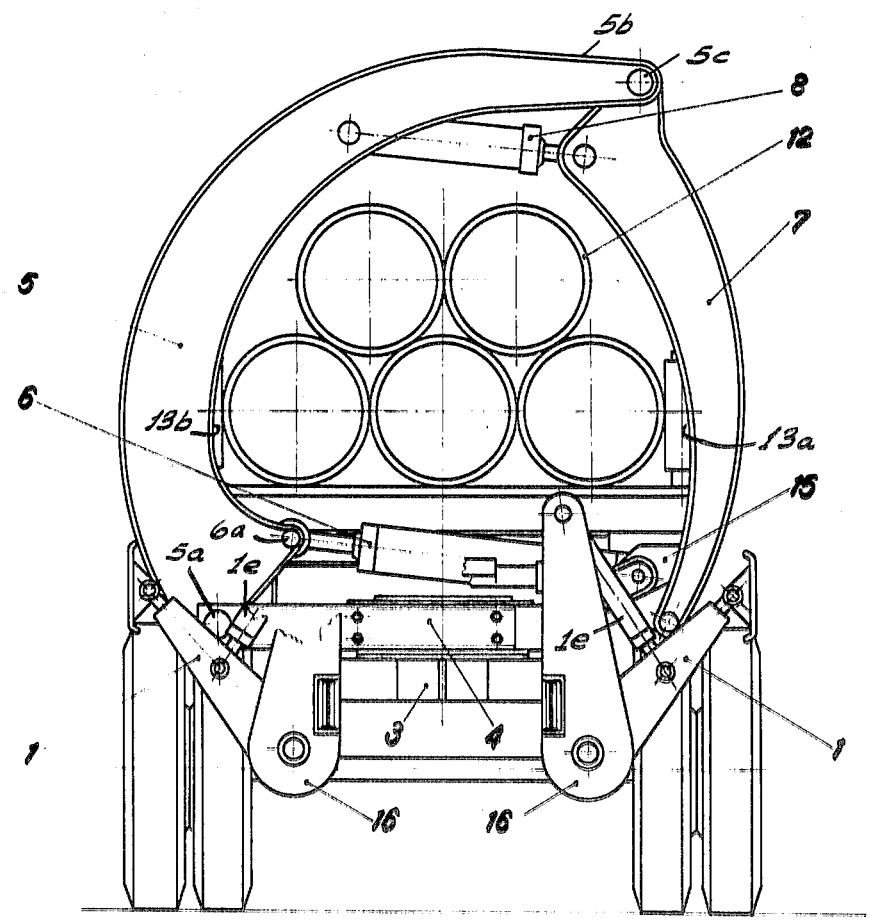
FIG. 2 is a section similar to FIG. 1 showing the positions of the arms during retention of the bodies on the trailer.

In the drawing, I show a trailer for the transport of elongated objects, e.g. pipes 12, which comprises generally a tractor C which draws via a swivel hitch or seat 2, a trailer A of the underslung type having in its dropped central portion D, a hydraulic lifting installation generally represented at B. As is best seen in FIGS. 1–3, the trailer is provided, at a longitudinal spacing from the lifting installation B, with a pressure shoe mechanism generally represented at 1 which comprises a pair of pressure shoes 1a swivelably secured at 1b to a pair of arms 1c articulated at 1d to casings 16 which are connected to the chassis. A pair of hydraulic cylinders 1e serve to swing the arms 1c about the pivots 1d from a retracted position (FIG. 2) to an extended position (FIG. 1) in which the pressure shoes 1a rest upon the ground to support the chassis and the lifting installation against movement during loading and unloading.

The loading and unloading installation, best seen in FIGS. 2–4, comprises a supporting pivot 3, (having an upright axis) about which a support frame or carriage 4 is rotatable. The carriage or frame 4 carries a first curved arm 5 which is swingable about a pivot 5a (FIG. 2) thereon having a horizontal axis. This C-shaped or crescent-shaped arm 5 is swingably connected at 6a to the piston rod of a hydraulic cylinder 6 which is anchored at a pivot 6b to the frame 4 as shown in FIG. 1. As the piston rod 6c of the hydraulic cylinder 6 is extended (see FIG. 1), the arm 5 is swung in its counterclockwise sense about the pivot 5a outwardly and away from its rest position which the free end 5b of the arm 5 overhangs the load of elongated bodies 12.

At this free end 5b of the arm 5, there is articulated at a pivot 5c a further C-shaped, crescent-shaped or curved arm 7, which has a free end 7a carrying a hook 10 to which appropriate means may be affixed for lifting the elongated bodies 12 (FIG. 1) The arm 7 may be swung in the counterclockwise sense to unload itself outwardly (FIG. 1) by a hydraulic cylinder 8 which is pivotally connected at 8a to the arm 5 and has a piston rod 8b hinged at 8c to the arm 7. Hence, when this piston rod 8b is extended, the arm 7 is swung outwardly and may overhang the side of the vehicle to pick up or deposit elongated bodies during transfer operations. A hitch 11 is provided between the hook 10 and the elongated bodies 12.

The trailer is also formed with a pair of supporting beams 13 and 14 (FIGS. 3 and 4) having uprights 13a and 13b, etc. to retain the load against lateral movement when the crane 5, 7 is unloaded.

After loading by the crane, the elongated bodies 12 rest upon the supporting beams 13 and 14 and are further immobilized by the arms 5 and 7 which envelop the load to form a security belt during transport When, however, the trailer is operated without a load, the frame 4 is swiveled through 90° (compare FIGS. 3 and 4) to position the crane 5, 7 along the longitudinal axis of the trailer, whereupon the curved arm is propped against a support 15 which connects the housing 16 of the pressure shoes.

The system has the obvious advantages of enabling loading and unloading as well as security fixing of the load with a single hydraulically operable installation and of being readily manipulated.

The hydraulic devices are operated by a pump driven by the engine and gear box of the tractor, the hydraulic system being controlled by a distributor shown at 9 in FIGS. 3 and 4.

What we claim is:

1. A trailer for manipulating and transporting elongated bodies, comprising a trailer having a longitudinally extending chassis; a pair of support members longitudinally spaced apart on said chassis for supporting a load of elongated bodies; pressure-shoe means on said chassis between said support members and operable to support said chassis against the ground during loading and unloading of the trailer; and a hydraulically operable crane mounted on said chassis between said support members, said crane comprising a carriage pivotally mounted to said chassis for movement about a vertical axis, a first curved arm swingably mounted on said carriage and having an operating position wherein said arm overhangs at least a portion of the load carried by said support members, a second curved arm articulated on said first curved arm and having a position wherein said load is girded by said arms when said arms lie generally transversely of said chassis, respective hydraulic cylinders for swinging said second arm relative to said first arm and said first arm relative to said carriage for loading said bodies on and unloading said bodies from said support members on said chassis, said chassis and said pivotal mounting for said carriage being disposed below said load when the load is carried by said support members, and a load-engaging hook mounted at a free end of said second arm and a hitch carried by said hook and engageable with said bodies, said trailer being drawn by a tractor having a pump connected with a gear box of the tractor, further comprising a distributor connected between said pump and said hydraulic cylinders.

2. The trailer defined in claim 1, wherein said pressure-shoe means comprises a pair of mounts for respective pivotal pressure feet, said trailer further comprising a support connecting said mounts, said second arm being adapted to rest upon said support in an unloaded condition of the trailer wherein said arms lie parallel to the longitudinal axis thereof.